United States Patent [19]

Wheeler

[11] 4,017,782

[45] Apr. 12, 1977

[54] DC-DC CONVERTER

[75] Inventor: Bruce C. Wheeler, Colchester, Vt.

[73] Assignee: General Electric Company, Burlington, Vt.

[22] Filed: Nov. 7, 1975

[21] Appl. No.: 630,551

[52] U.S. Cl. .............................................. 321/2
[51] Int. Cl.[2] ..................................... H02M 3/335
[58] Field of Search ................................... 321/2

[56] References Cited

UNITED STATES PATENTS

| 3,400,319 | 9/1968 | Stich | 321/2 |
| 3,564,393 | 2/1971 | Williamson | 321/2 X |
| 3,771,040 | 11/1973 | Fletcher et al. | 321/2 |

Primary Examiner—William M. Shoop
Attorney, Agent, or Firm—Bailin L. Kuch

[57] ABSTRACT

A DC to DC Converter is disclosed which uses a simple oscillator with a variable duty cycle to maintain a constant energy input into the primary inductance of an output transformer irrespective of the input voltage to the converter.

6 Claims, 1 Drawing Figure

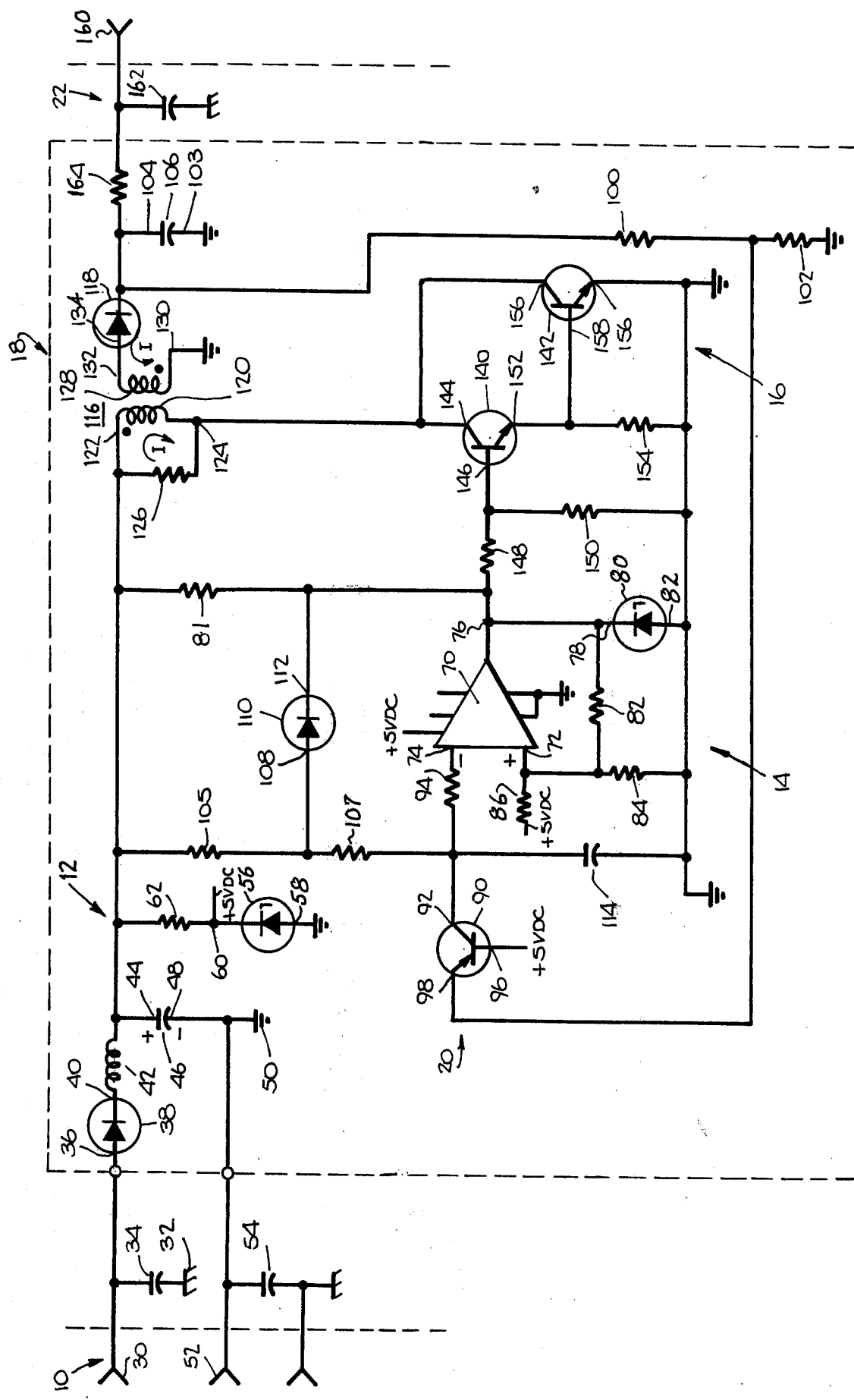

1

DC-DC CONVERTER

BACKGROUND OF THE INVENTION

1. Field of the Invention

This invention relates to a mechanism for providing a relatively high, and relatively stable, DC voltage from a relatively low and unstable DC voltage source.

2. Prior Art

Dahlinger et al, in U.S. Pat. No. 3,569,818, issued Mar. 9, 1971, discloses a DC voltage regulator utilizing a transistor switch in the primary circuit of a transformer and providing a regulated output voltage at a rectified output of the transformer secondary coil. A comparator turns on the transistor switch whenever the regulated output voltage falls below a predetermined level. Feedback circuitry to the comparator differs substantially from that of the subject converter and the switching rate is not controlled as a function of unregulated source voltage.

Sautel, in U.S. Pat. No. 3,611,105, issued Oct. 5, 1971, discloses a DC voltage converter for converting a DC source voltage into a regulated voltage at a floating potential with respect to ground. Current from the source is switched by a transistor in series with the source and a primary transformer winding to provide a chopped output current at the secondary winding which is rectified and filtered to provide the regulated output voltage. A feedback loop from the regulated output to a comparator effects a time modulated control of the switching transistor to maintain the output at a predetermined voltage level under load variation. Although operation of this converter generally resembles that of the subject converter, the transistor is switched at a fixed frequency at varying duty cycles while the switching transistor of the subject converter is switched at both varying frequencies and duty cycle. Also, the feedback circuitry is dissimilar from that of the subject converter.

Brokaw, in U.S. Pat. No. 3,790,878, issued Feb. 5, 1974, discloses a switching regulator for providing a regulated DC output voltage. Energy from an unregulated DC voltage is periodically dumped into a transformer primary winding under the control of a switch in series with the source voltage and the primary winding. The energy is transferred to the transformer secondary winding and then rectified, filtered and applied to the load. The ratio of switch-on time to switch-off time is dependent upon several factors including a feedback voltage proportionate to the output voltage. The Brokaw regulator operates in a manner resembling that of the subject converter and includes similar feedback circuitry to a comparator, but circuitry for controlling a comparator input as a function of source voltage is not disclosed.

SUMMARY OF THE INVENTION

An object of this invention is to provide a regulated high DC voltage output; for example, 270 VDC ± 10% from an unregulated low DC voltage source; for example 18–46 VDC. An exemplary use is to fire electrically primed ammunition using an aircraft's DC power system.

Another object is to provide a mechanism having such an output characteristic without the use of precision reference voltages.

A feature of this invention is the use of a DC to DC converter which uses a simple oscillator with a variable duty cycle to maintain a constant energy input into the primary inductance of an output transformer irrespective of the input voltage to the converter.

BRIEF DESCRIPTION OF THE DRAWING

These and other objects, features and advantages of this invention will be apparent from the following specification thereof, taken in conjunction with the accompanying drawing, in which:

The FIGURE is a schematic diagram of a preferred embodiment of the invention.

DESCRIPTION OF THE INVENTION

In brief, the subject converter draws power from a source whose voltage varies over a wide range, and provides a constant, e.g. 270, volt DC output to a capacitive load. A differential amplifier compares feedback voltage from the converter output with a reference voltage and controls switching of transistors in series with a primary coil of a transformer. The transformer secondary coil provides power which is rectified to provide the converter output voltage. The comparator maintains the transistors in a switching condition until the output voltage reaches 270 volts. At this time, the transistors are switched OFF and they remain OFF until the converter output voltage drops below a predetermined level. A capacitor is connected between a feedback input of the comparator and ground potential. The capacitor charges at a rate proportional to the magnitude of the source voltage, effecting a duty cycle of current passing through the transformer primary which is inversely proportional to the source voltage. This variation in duty cycle is utilized to maintain a constant power input to the transformer over a wide range of source voltages. A transistor switch is provided in the output voltage feedback path to effect rapid charging of the capacitor when the converter output voltage reaches 270 volts so that the primary coil switching transistors are cut off at this time.

As seen in the FIGURE, the DC to DC converter comprises an EMI suppression, low-pass filter, input circuit 10, a reference voltage generator 12, an oscillator 14, a power switch 16, a power storage circuit 18, an oscillator control circuit 20, and an output circuit 22.

The input circuit 10 includes a positive terminal 30 coupled to the chassis ground 32 through a capacitor 34, and also coupled to the anode terminal 36 of a diode 38, whose cathode terminal 40 is coupled through an inductor 42 to one plate 44 of an input energy storage capacitor 46 whose other plate 48 is coupled to the circuit ground 50. A ground terminal 52 is coupled to the chassis ground through a capacitor 54 and is also coupled directly to the circuit ground.

The reference voltage generator 12 includes a zener diode 56 whose annode terminal 58 is connected to the circuit ground and whose cathode terminal 60 is coupled through a resistor 62 to the capacitor plate 44. The exemplary diode 56 has a breakdown voltage of 5.1 VDC ± 5% and, therefore, the terminal 60 serves as a reference voltage source of substantially 5 VDC as regulated by the zener diode.

The oscillator 14 is a regulated frequency oscillator having a square wave output. Its frequency is inversely responsive to source voltage. Its square wave on-time, or period of positive voltage output, is directly responsive to control current, but its off-time, or period of zero voltage output, is relatively constant. The oscillator includes a comparitor 70, which may be a fast-saturating, differential amplifier, having a positive input terminal 72, a negative input terminal 74, and an output terminal 76. The output terminal 76 is connected to the cathode terminal 78 of a zener diode 80 whose anode terminal 82 is connected to the circuit ground. The exemplary zener diode has a breakdown voltage of 7.5 V, and, therefore, the maximum output voltage at terminal 76 is 7.5 VDC. When the voltage on the input terminal 72 is greater than the voltage on the input terminal 74, the voltage at the output terminal 76 is high, e.g. 7.5 VDC; when the relative magnitudes are reversed, the voltage at terminal 76 is low, e.g. zero VDC. The voltage at the terminal 72 is a function of the voltage at the plate 44 as determined by the voltage divider network including the resistors 81, 82, 84, and 86. The resistor 81 is connected between the plate 44 and the terminal 76; the resistor 82 is connected between the terminal 76 and the terminal 72; the resistor 84 is connected between the terminal 72 and circuit ground; and the resistor 86 is connected between the terminal 72 and the terminal 60. The comparitor may be considered to have an internal transistor switch coupled between the output terminal 76 and circuit ground, to float the terminal 76 or to ground it, in response to the relative voltages at the terminals 72 and 74.

The oscillator control circuit 20 includes a transistor 90 whose collector terminal 92 is connected through a resistor 94 to the terminal 74, whose base terminal 96 is connected to terminal 60, and an emitter terminal 98. A voltage divider is provided to measure the voltage in the output loop and consists of resistors 100 and 102. The resistor 100 is connected between the plate 104 of the output capacitor 106 and the terminal 98; the resistor 102 is connected between the terminal 98 and circuit ground. The other plate 103 of the capacitor is connected to circuit ground. An additional voltage divider consists of resistors 105 and 107. The resistor 105 is connected between the plate 44 and the anode terminal 108 of a diode 110. The resistor 107 is connected between the terminal 108 and the terminal 92. The cathode terminal 112 of the diode is directly connected to the terminal 76. A capacitor 114 is coupled between the cathode terminal 92 and circuit ground. These resistors, diode and capacitor may be considered part of the oscillator circuit. The oscillator is on so long as there is voltage difference between the input terminals 72, 74 of the comparitor. The voltage on the terminal is determined by the charge on the capacitor 114. During on-time of the oscillator, the terminal 76 is high, the diode is reversed-biased, and therefore, the rate of charge of the capacitor 114 is determined by the voltage across the resistors 105 and 107. During off-time, the terminal 76 is low and therefore the diode 110 conducts, bringing the junction of the resistors 105 and 107 effectively to ground potential, and, therefore, the rate of discharge is determined by the resistor 107 alone. As the voltage on the plate 104 approaches the desired magnitude, the transistor 90 starts to conduct, and to thereby shorten the on-time of the oscillator. When the voltage in the plate 104 has reached the full desired magnitude, the transistor has increased its conduction to shorten the on-time of the oscillator to substantially zero.

The power storage circuit 18 includes a transformer 116, a diode 118, and the capacitor 106. The transformer has a primary winding 120, having one terminal 122 connected to the plate 44 and another terminal 124. A damping resistor 126 is connected between the terminals 122 and 124. The transformer has a secondary winding 128, having one terminal 130 connected to circuit ground and another terminal 132 connected to the anode terminal 134 of the diode 118. The cathode terminal of diode 118 is connected to the plate 104.

The power switch 16 includes a driver transistor 140 and a power transistor 142. The driver transistor 140 has its collector terminal 144 connected to the transformer primary winding terminal 124, its base terminal 146 connected through a resistor 148 to the terminal 76 and through a resistor 150 to circuit ground, and its emitter terminal 152 connected through a resistor 154 to circuit ground. The power transistor 142 has its collector terminal 156 connected to the driver transistor collector terminal 144, its base terminal 158 connected to the control transistor emitter terminal 152, and its emitter terminal 156 connected to circuit ground. An input power current loop is provided through the input capacitor 46, the transformer primary winding 120, the power transistor switch 142 and chassis ground. An output power current loop is provided through the transformer secondary winding 128, the diode 118, the output capacitor 106, and chassis ground.

The transformer windings are arranged as shown by the polarity dots to induce respective current flows as shown. When the power transistor switch 142 is conducting, providing current flow through the primary winding, and establishing a magnetic field around the primary winding, any induced current flow in the secondary winding is precluded by the diode 118 acting as an open switch to the flow of current, and the primary winding acts as a pure inductor to store energy. When the switch 142 becomes nonconducting, the established magnetic field decays, inducing a current flow in the secondary winding in the opposite direction which is permitted by the diode 118 acting as a closed switch, thereby charging the capacitor 106.

The output circuit 22 includes an output positive terminal 160 which is coupled to the chassis ground through a capacitor 162 to provide a low pass filter, and which is coupled to the plate 104 through a resistor 164 to limit current flow to the utilization device.

The invention has thus been described but it is desired to be understood that it is not confined to the particular forms or usages shown and described. The same being merely illustrative, and that the invention may be carried out in other ways without departing from the spirit of the invention, and therefore, the right is broadly claimed to employ all equivalent instrumentalities coming within the scope of the appendent claims, and by means of which objects of this invention are attained and new results accomplished, as it is obvious that the particular embodiment herein shown and described is only one of the many that can be employed to obtain these objects and accomplish these results.

What is claimed is:
1. A DC to DC converter comprising:
a relatively low voltage, direct current source;
first inductor means and second inductor means, mutually magnetically coupled;
rectifier means;
energy storage means;
switching means having a conductive state and a nonconductive state;

oscillator means having an output on-state and an output off-state, the duration of said off-state being substantially constant, the duration of said on-state being inversely responsive to a control voltage, and said oscillator means being coupled to said current source to receive such a control voltage therefrom so that the duration of said output on state is an inverse function of the voltage level of said current source;

oscillator control means;

said current source, said first inductor means and said switching means being coupled in an input current series loop;

said second inductor means, said rectifier means and said energy storage means being coupled in an output current series loop;

said oscillator means being coupled to said switching means, and when in said output on-state causing said switching means to be in its conductive state, and when in its output off-state causing said switching means to be in its nonconductive state.

said oscillator control means being coupled to and between said energy storage means and said oscillator means to provide a signal to said oscillator means to progressively reduce said duration of said output on-state to substantially zero in response to the voltage level of said storage means progressively reaching a preset value;

said rectifier means and said second inductor means being of such polarity and winding orientation respectively with respect to the winding orientation of said first inductor means, that when said switching means is in its on-state, said rectifier means is not conducting and said second inductor means is open circuited and, therefore, said first inductor means stores energy in its magnetic field, and when said switching means is in its off-state, said first inductor means is open circuited, said rectifier means is conducting and said second inductor means extracts energy from said magnetic field, 2. A converter according to claim 1 wherein:

said oscillator means includes a comparitor having a first and second input terminal;

a source of reference voltage coupled to said first input terminal;

a resistor and a capacitor in series, coupled in parallel with said first inductor means and said switching means of said input loop, having their common junction coupled to said second input terminal, having a mode of operation such that the current flow through and the rate of charge of said capacitor are a direct function of said voltage level of said direct current source, whereby the duration of said oscillator on-time is an inverse function of said rate of charge.

3. A converter according to claim 2 wherein:

said oscillator control means is a voltage controlled current source which is coupled to said common junction to provide increasing current flow through said capacitor as said voltage of said storage means approaches said preset value.

4. A converter according to claim 1 wherein:
said energy storage means includes a capacitor.

5. A converter according to claim 1 wherein:
said direct current source includes a capacitor.

6. A converter according to claim 1 wherein:
said switching means includes
a three terminal device biased into conduction when said oscillator is in its on-state.

* * * * *